US005885537A

United States Patent [19]

De Muynck

[11] Patent Number: 5,885,537

[45] Date of Patent: Mar. 23, 1999

[54] METHOD AND DEVICE FOR PURIFYING GASES

[75] Inventor: José Omer Arnold De Muynck, Wingene, Belgium

[73] Assignees: Groep Danis, naamloze vennootschap, Koolskamp; Norbert Druwel, Kluisbergen, both of Belgium

[21] Appl. No.: 860,921

[22] PCT Filed: Jan. 16, 1996

[86] PCT No.: PCT/BE96/00004

§ 371 Date: Jul. 17, 1997

§ 102(e) Date: Jul. 17, 1997

[87] PCT Pub. No.: WO96/22158

PCT Pub. Date: Jul. 25, 1996

[30] Foreign Application Priority Data

Jan. 17, 1995 [BE] Belgium ............................... 09500034

[51] Int. Cl.[6] ................................ B01D 53/44; B01J 8/12

[52] U.S. Cl. ................... 423/210; 423/245.1; 423/245.3; 422/168; 422/173; 422/177; 422/234; 422/239

[58] Field of Search .................................... 422/190, 191, 422/193, 213, 216, 232, 234, 236, 239, 168, 173, 177; 423/245.1, 245.3, DIG. 16; 431/7; 432/215; 588/205

[56] References Cited

U.S. PATENT DOCUMENTS

| | | | |
|---|---|---|---|
| 2,445,554 | 7/1948 | Bergstrom | 263/19 |
| 2,636,575 | 4/1953 | Watson | 183/114.2 |
| 4,102,776 | 7/1978 | Stone | 208/64 |
| 4,531,907 | 7/1985 | Kawamura | 431/7 |
| 5,762,010 | 6/1998 | De Muynck | 110/346 |

FOREIGN PATENT DOCUMENTS

| | | |
|---|---|---|
| 695238 | 5/1967 | Belgium . |
| 0 553 041 A1 | 7/1993 | European Pat. Off. . |
| 1528650 | 6/1968 | France . |
| 41572 | 2/1887 | Germany . |
| 52-68859 | 6/1977 | Japan . |
| 622112 | 4/1949 | United Kingdom . |
| 677275 | 8/1952 | United Kingdom . |

*Primary Examiner*—Gary P. Straub
*Assistant Examiner*—Timothy C Vanoy
*Attorney, Agent, or Firm*—Bacon & Thomas, PLLC

[57] ABSTRACT

Method for decomposing thermally decomposable components such as organic compounds which are present in gases, whereby these gases are led through a heat exchange medium consisting of particles of a substance such as clay or aluminates which resist decomposing at the decomposition temperature of the decomposable of the decomposable components, and whereby these gases are heated in the heat exchange medium up to the decomposition temperature of the decomposable components. The heat exchange medium is continuously carried around and consequently carried away from a first zone (30) in which this heat exchange medium heats the gases and is again carried to a second zone (31) in which the heat exchange medium is heated, at least partly by the waste gases of the combustion of the decomposable components and/or of the decomposition products thereof and by the remainder of the gases which were further heated by this combustion, which combustion mainly takes place in a combustion zone (32) situated between these zones (30 and 31).

14 Claims, 2 Drawing Sheets

13
28
31
7
1
26
19
2
3
34
23
15
4
16
12
5
12
32
6
24
25
18
5
II
II
15
21
33
20
22
17
F3
16
29
30
8
14
27

1
3
12
2
26
5
12
8
4
15
18

9
15
1
11
10
8
9
4
9
2
3
17

METHOD AND DEVICE FOR PURIFYING GASES

BACKGROUND OF THE INVENTION

1. Field of the Invention

This application is a national stage filing under 35 U.S.C. §371 of PCT/BE96/00004 filed 16 Jan. 1996.

The present invention concerns a method for purifying gases which contain thermally decomposable components, whereby these thermally decomposable components are thermally decomposed.

2. Related Technology

By thermally decomposable components are mainly understood volatile organic components which usually give off an unpleasant smell. Such components are for example aromatic or aliphatic compounds.

Due to the decomposition, these decomposable components are decomposed in harmless end products.

In particular, the invention concerns a method for decomposing thermally decomposable components, in particular volatile organic components which are present in gases, whereby these gases are led through a heat exchange medium consisting of particles which resist the decomposition temperature, and whereby these gases are heated in said heat exchange medium up to the decomposition temperature of the decomposable components. The gases may be derived from the drying and/or burning of organic waste and may largely consist of steam.

In a known method of the above-mentioned type, the gases are carried downward by means of a stationary heat exchange medium consisting of ceramic rings, in which is erected an electrical heat resistor.

In this known method, the heat exchange medium is polluted relatively fast, so that it has to be replaced relatively quickly.

This known method cannot be used for damp gases.

BRIEF SUMMARY OF THE INVENTION

The invention aims a method for decomposing thermally decomposable components which are present in gases, with an excellent heat exchange, whereby the heat exchanging mass has to be replaced less quickly and whereby this method can also be used for damp gases.

This aim is reached according to the invention in that the heat exchange medium is continuously carried around and consequently carried away from a first zone in which this heat exchange medium heats the gases and is again carried towards a second zone in which the heat exchange medium is heated, at least partly by the waste gases of the combustion of the decomposable components and/or of the decomposition products thereof and by the remainder of the gases which were further heated by this combustion, which combustion mainly takes place in a combustion zone situated between these zones.

The carrying around of a heat exchange medium through which gases flow is known from U.S. Pat. No. 2,363,575, but the heat exchange medium is an adsorbent which is mainly used for drying air in a topmost zone, whereas in a bottommost zone, the adsorbent is dried by other air which is heated by a burner. It is mentioned that the adsorbent can be a catalyst, whereby a catalytic reaction in this case takes place in the topmost zone and whereby the catalyst is purified of adsorbed reagents and products in the bottommost zone.

According to a particular embodiment of the invention, external calorific value is supplied to the combustion zone.

In the first and the second zone, the heat exchange medium is for example moved down through due to gravitation.

The gases are preferably lead in a cross-current manner over the heat exchange medium, in such a manner that they cross said heat exchange medium several times.

A suitable heat exchange medium is a granulated mass.

The invention also concerns a device which is particularly suitable to carry out the method according to any of the above-described embodiments.

Thus, the invention concerns a device for thermally decomposing thermally decomposable components which are present in gases, characterized in that it contains a tower with three coaxial cylindrical standing casings including an inner casing provided with openings which is closed at the bottom and at the top, a second casing provided with openings erected around this inner casing and an outer casing which surrounds this second casing. Walls are provided in the space between the second casing and the outer casing, which walls divide this space in chambers which are situated on top of one another and which open into the space between the second casing and the inner casing via said openings in the second casing. The space inside the inner casing is divided in a top chamber and a bottom chamber by at least one partition; the device further includes a heat exchange medium between the inner casing and the second casing which consists of particles; means to collect this heat exchange medium at the bottom of the tower and to supply it back to the top of the tower between the inner casing and the second casing; and means to introduce the gases at the bottom through the second casing and to discharge the gases at the top through the second casing, said means comprising an inlet for the gases which opens into a chamber situated at the bottom and an exhaust for the gases which opens into a chamber situated at the top.

Practically, the device contains means to supply calorific value from outside to the gases between the inlet and the exhaust, either in the shape of hot gases or in the shape of injected fuel.

BRIEF DESCRIPTION OF THE DRAWINGS

In order to better explain the characteristics of the invention, the following preferred embodiment of a method and device according to the invention for decomposing thermally decomposable components which are present in gases is described as an example only without being limitative in any way, with reference to the accompanying drawings, in which.

DETAILED DESCRIPTION OF THE PREFERRED EMBODIMENTS

Figure 1:
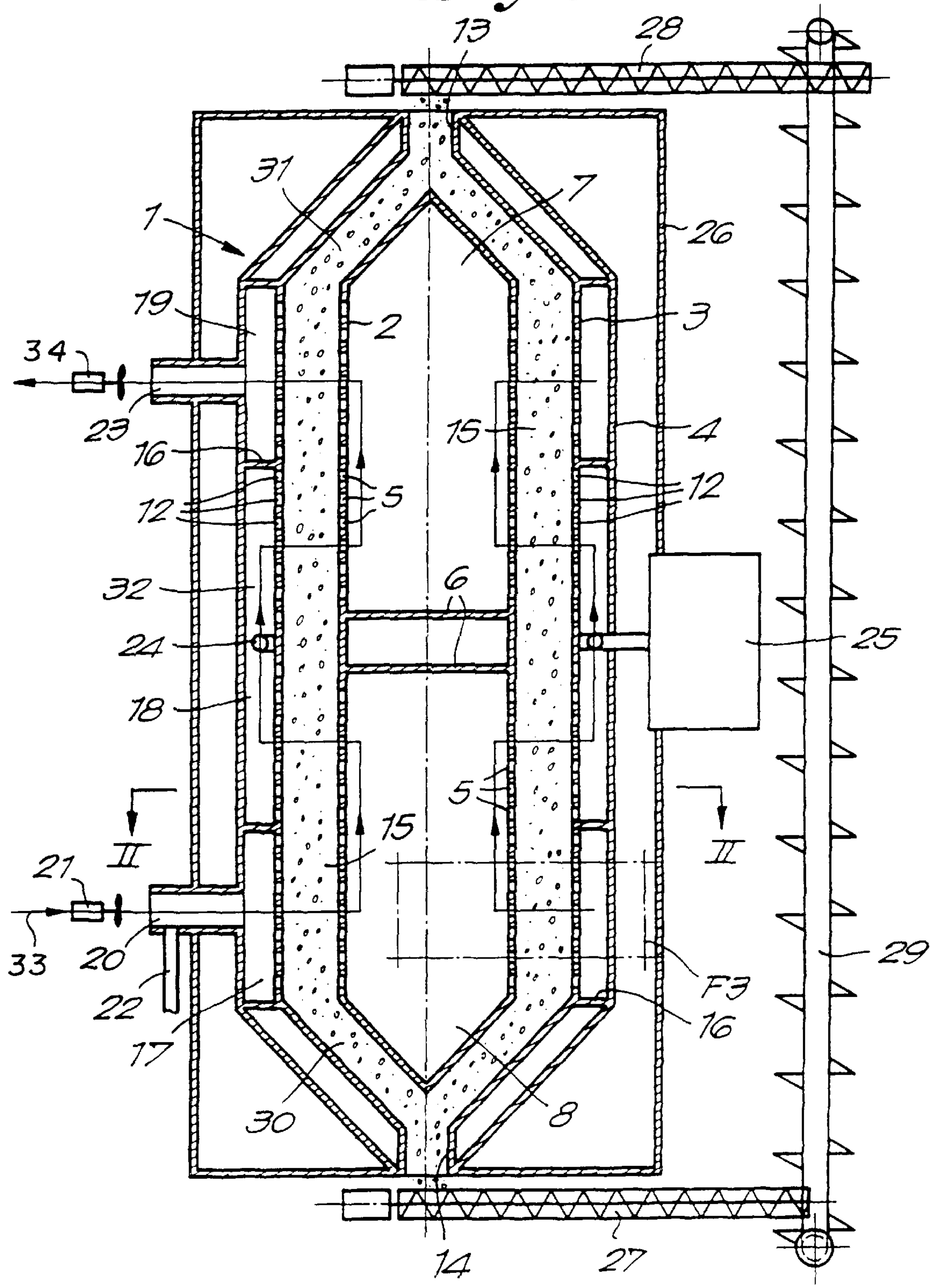
FIG. 1 schematically shows a section of a device for decomposing thermally decomposable components according to the invention.
Figure 2:
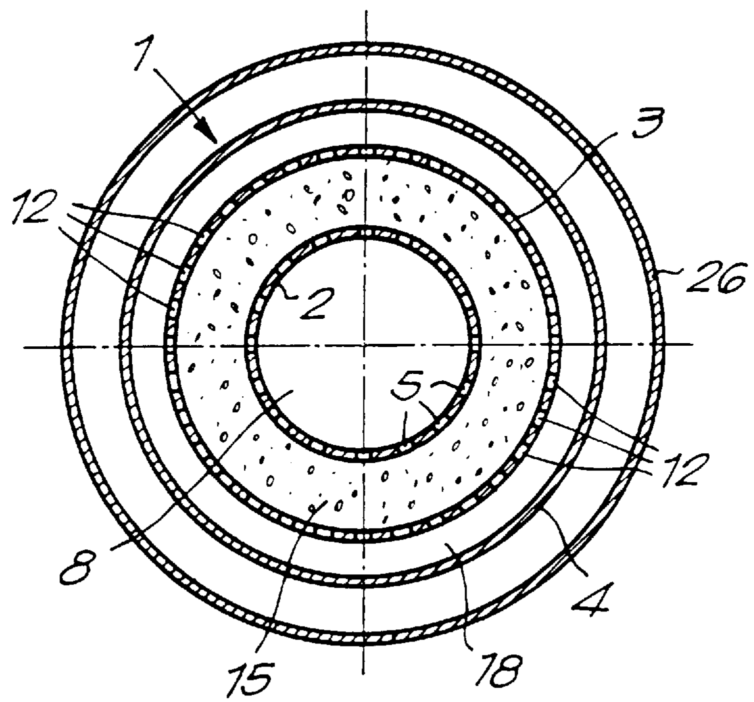
FIG. 2 shows a section according to line II—II in FIG. 1.

As represented in the figures, the device for decomposing thermally decomposable components which are present in gases 33 contains a tower 1 which mainly consists of three coaxial standing casings 2, 3 and 4 which for cylinders which are conically tapered on both ends.

The inner casing 2 is closed at the top and at the bottom and is provided with openings 5 in its cylindrical part.

The space inside this casing 2 is divided by partitions 6 in a top chamber 7 and a bottom chamber 8.

Figure 3:
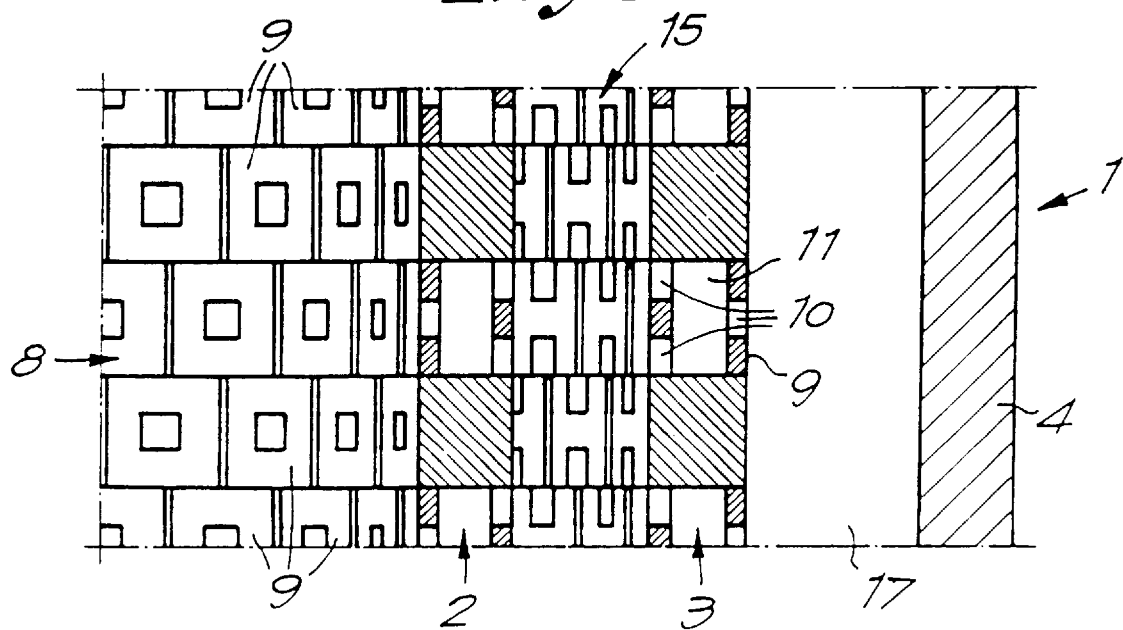
FIG. 3 shows the detail which is indicated by F3 in FIG. 1 to a larger scale.

As represented in detail in FIG. 3, this casing 2 can be made of hollow flame-resistant stones 9 which are provided with windows 10 in their bent walls which form the above-mentioned openings 5 together with the cavity 11 in the stones.

The second, in other words the middlemost casing 3 is also provided with openings 12 in its cylindrical part and can be made of similar flame-resistant stones 9 in the same manner as the inner casing 2.

The outer casing 4 is a solid wall of for example gas concrete.

The conically tapered outer parts of these casings 3 and 4 are open at their end, such that at the top and at the bottom of the tower 1, they respectively form an inlet 13 and an exhaust 14 which open into the space 15 which is formed between the inner casing 2 and the second casing 3.

The space between the second casing 3 and the outer casing 4 is divided by ring-shaped walls 16 in three ring-shaped chambers situated on top of one another, namely a bottom chamber 17, a middlemost chamber 18 and a topmost chamber 19.

In case the second chamber 3 is formed of hollow stones 9 at the place of a ring-shaped wall 16, the hollow stone 9 is replaced by a solid stone in order to prevent that the chambers 17, 18 and 19 are directly connected to one another via the casing 3.

The space between the inner casing 2 and the second casing 3 is not interrupted but filled with a heat exchange medium in the shape of a granulated mass consisting of particles which resist decomposing at the temperatures required to dissolve the volatile organic components in the gases and which in particular resist temperatures of 800° to 900° C. For clarity's sake, this granulated mass is not represented in FIG. 3.

Suitable particles are particles which easily absorb and give off heat such as burnt clay, aluminate, for example calcium aluminate or a composition containing aluminate.

Not only can these particles ensure a good heat transfer, but possibly they can also have a catalytic action.

The gases 33, which are derived from the drying and/or burning of organic waste, for example which are derived from a waste treatment unit, and which mainly consist of steam with volatile, thermally decomposable organic components which are usually harmful, can be supplied via an inlet 20 which opens into the bottom chamber 17 through the outer casing 4 by means of a fan 21 mounted in this inlet.

To this inlet 20 is connected a pipe 22 for supplying hot air to the gases 33.

The gases are discharged from the top chamber 19 via an exhaust 23 which extends through the outer casing 4 and in which is also mounted a fan 34.

Calorific value or heat can be supplied to the granulated mass by means of a ring-shaped gas pipe 24 which is erected in the middlemost chamber 18, which is provided with openings and is connected to an external burner 25 which is erected outside the outer casing 4.

The outer casing 4 is further surrounded by a housing 26 through which the above-mentioned inlets 13 and 20 and the exhausts 14 and 23 extend.

Under the exhaust 14 for the granulated mass is erected a discharge screw 27 and above the inlet 13 for this granulated mass is erected a supply screw 28. In order to carry the granulated mass from one screw to the other, an elevator 29 is provided between the discharge screw 27 and the supply screw 28.

A quantity of hot air, preferably up to 10 vol %, is added to the gases via the pipe 22 to supply a sufficient amount of oxygen for the combustion of the thermally decomposable components and/or decomposition products thereof as well as air for the possible combustion of the gases injected via the gas pipe 24.

This air preferably has a temperature of over 650° C., which also provides for a pre-heating of the gases 33, and, if these gases contain steam, lowers the saturation temperature of this steam and in this manner prevents condensation.

The principle of the gas purification, or in other words the decomposition of the decomposable components into harmless end products, consists in making the granulated mass circulate and leading the gases 33 in counterflow in relation to a downward flow of this granulated mass, whereby the gases cross the flow of the granulated mass several times.

This crossing becomes possible as the inner casing 2 and the second casing 3 are provided with openings 5, 12 respectively.

At a normal regime, the gases 33 are heated in a first, bottommost zone 30 of the granulate mass by the latter, whereas in a second, topmost zone 31 this granulated mass is heated by the waste gases of the combustion or pyrolysis of the volatile organic components and/or decomposition products thereof on the one hand, and by the waste gases of the external burner 25 which are introduced in the combustion zone 32 situated between the zones 30 and 31 via the gas pipe 24.

The gases 33, at a temperature between 150° and 200° C., are blown in the bottommost zone 31 via the inlet 20 and the bottommost chamber 17 and through the second casing 3.

As indicated by the arrows, the main part of these gases flows through the granulated mass and through the inner casing 2 in the bottommost chamber 8, whereby these gases are heated.

The gases 33 are stopped by a partition 6 and as a result again flow right through the zone 31 up to the middlemost chamber 18 between the casings 3 and 4, whereby they are further heated by the granulated mass.

During said heating of the gases, at least a part of the decomposable components usually already start to decompose into gaseous decomposition products which can be further thermally decomposed or burnt.

In this middlemost chamber 18 and the part of the granulated mass connected to it via openings 12 in the second casing 3 is formed the combustion zone 32. In this combustion zone 32, the further decomposition of the decomposable components and/or decomposition products thereof takes place, and especially the combustion of the gaseous decomposition products into harmless end products, in particular $CO_2$, $H_2$ and $N_2$. In this combustion zone 32, also the waste gases of the external burner 25 are possibly further burnt.

The temperature of the gases rises in this combustion zone 32 with over 100° C., up to 800° to 900° C. or even more.

According to a variant, either ordinary heated gases or pure, for example gaseous fuel can be supplied via the gas pipe 24 instead of waste gases.

Due to the injection of gases via the gas pipe 24 in the combustion zone 32, an excess pressure of less than 1.05 times the atmospheric pressure is created, and these gases are spread in the other gases. Thus, the formation of nitrogen oxides is prevented.

On top of the middlemost chamber 18, the hot gases again radially flow through the granulated mass, namely the topmost zone 31 thereof, into the chamber 7, whereby the gases heat the granulated mass.

Thanks to the fan 34 in the exhaust 23 for the gases and because the chamber 7 is closed at the top, the predominantly purified gases flow, opposite the exhaust 23, radially outward from the chamber 7 through the granulated mass, such that they further heat this granulated mass.

These gases are discharged via the topmost chamber 19 and the exhaust 23 and leave the tower 1 at a temperature of over 150° C.

During this circulation of the gases 33, the granulated mass is carried around. This mass continuously descends in the space 15 between the inner casing 2 and the second casing 3 due to gravitation.

At the bottom, cooled granulated mass is collected on the discharge screw 27. This mass is carried via the elevator 29 on the supply screw 28 and carried to the top of the space 15 by this supply screw.

The heat exchange between the granulated mass and the gases is excellent and the purification of the gases by means of decomposition or combustion of the thermally decomposable components can be carried out in a very economic manner.

Although the granulated mass is self-cleaning to a large extent, it can be further cleaned outside the tower 1 during the circulation. During the purification, this granulated mass can be replaced in part or as a whole by new mass.

In the tower 1, the granulated mass can operate as a filter which stops the solid particles which may possibly be present in the gas flow, which preferably flows at a speed which is lower than 1.5 m/sec. During the cleaning of the granulated mass, these solid particles can then be removed via the discharge screw 27.

Components such as metals which have been released during the purification, in particular copper, can precipitate on the particles of the granulated mass when it cools off. Thanks to the mutual friction of the particles as the granulated mass moves, this precipitation of the particles is removed.

The method can be applied to damp gases, but these gases must not necessarily consist mainly of steam.

The circulation of the granulated mass must not necessarily take place by means of an elevator. It can for example also take place by means of screws or such.

Also the flow of the gases must not necessarily be caused by means of two fans. It can also be done with a single fan or with one or more extractors.

Calorific value from outside the combustion zone is added as required. It is not excluded that, once the starting up is over, such addition is no longer required as the decomposition or combustion of the organic components in the gases provides sufficient heat to keep the decomposition going.

The present invention is by no means limited to the above-described embodiments represented in the accompanying drawings; on the contrary, such a method and device can be made in all sorts of variants while still remaining within the scope of the invention as described in the following claims.

I claim:

1. A method of decomposing thermally decomposable components which are present in gases, comprising the steps of:

a) passing gases containing thermally decomposable components through a heated, flowable heat exchange medium comprising heated particles which resist decomposing at the decomposition temperature and heating said gases by the heated heat exchange medium at least up to the decomposition temperature of the decomposable components;

b) continuously circulating the heated heat exchange medium to a first zone in which the heat exchange medium heats the gases and to a second zone in which the heat exchange medium is at least partly heated by the waste gases of a combustion of the decomposable components and/or of the decomposition products thereof and by the remainder of the gases which were further heated by this combustion, said combustion being carried out substantially in a combustion zone situated between the first and second zones.

2. The method according to claim 1, wherein the thermally decomposable components in the gases are volatile organic components and the gases in the combustion zone are heated up to 800° C. or more.

3. The method according to claim 1, wherein before the gases reach the combustion zone, air is supplied to the gases.

4. The method according to claim 3, including supplying the air at a temperature of over 650° C.

5. The method according to claim 3 wherein up to 10% by volume of air is added to the gases.

6. The method according to claim 1, including adding calorific value other than combustion of said gases to the combustion zone.

7. The method according to claim 1 including providing an excess pressure in the combustion zone of less than 1.05 times the atmospheric pressure.

8. The method according to claim 1 including moving the heat exchange medium in the first and second zones by gravity, and passing the gases in a cross-current manner through the falling heat exchange medium, such that the gases cross said heat exchange medium several times.

9. The method according to claim 1 including using a granulated mass as the heat exchange medium.

10. The method according to claim 9, including using as the granulated mass a material selected from the group consisting of clay, aluminate and a composition containing aluminate.

11. A device for thermally decomposing thermally decomposable components which are present in gases, comprising; a tower having three coaxial cylindrical standing casings, including a first inner casing provided with openings and which is closed at the bottom and at the top; a second casing provided with openings erected around the inner casing; and a third outer casing which surrounds the second casing; transverse divider walls disposed in the space between the second casing and the third casing, said divider walls dividing the said space into vertically spaced outer chambers which open into the portion of the space between the second casing and the first casing via said openings in the second casing; the volume inside the inner casing being divided into a top inner chamber and a bottom inner chamber by at least one inner transverse partition; a heat exchange medium contained between the first casing and the second casing, said medium comprising heated particles; means to collect the heat exchange medium at the bottom of the tower and to circulate it back to the top of the tower between the inner casing and the second casing; and means for introducing gases containing thermally decomposable components at the bottom of the tower into the second casing and to discharge the gases out of the top area of the second casing, said means comprising an inlet for the gases which opens into an inlet chamber situated at the bottom of the tower and an exhaust for the gases which opens into an exhaust chamber located at the top of the tower.

12. The device according to claim 11, including means to supply calorific value from outside of the tower to the gases between the inlet and the exhaust for the gases.

13. The device according to claim 12, wherein said vertically spaced outer chambers include at least a middlemost outer chamber, and wherein said means to add calorific value to the gases includes a gas supply pipe which discharges into said middlemost outer chamber.

14. The device according to claim 13, wherein said means to add calorific value to the gases includes an external burner outside the outer casing.

* * * * *